(12) United States Patent (10) Patent No.: US 11,223,087 B2
Hostler et al. (45) Date of Patent: Jan. 11, 2022

(54) STRUCTURAL POTTING MATERIAL USED TO INCREASE CRUSH RESISTANCE

(71) Applicant: A123 Systems LLC, Waltham, MA (US)

(72) Inventors: Jonathan Hostler, Canton, MI (US); Antoine Jourdan, Stuttgart (DE); Peter Won, Cupertino, CA (US)

(73) Assignee: A123 Systems LLC, Waltham, MA (US)

( * ) Notice: Subject to any disclaimer, the term of this patent is extended or adjusted under 35 U.S.C. 154(b) by 155 days.

(21) Appl. No.: 16/607,355

(22) PCT Filed: Apr. 23, 2018

(86) PCT No.: PCT/US2018/028916
§ 371 (c)(1),
(2) Date: Oct. 22, 2019

(87) PCT Pub. No.: WO2018/200399
PCT Pub. Date: Nov. 1, 2018

(65) Prior Publication Data
US 2020/0052263 A1 Feb. 13, 2020

Related U.S. Application Data

(60) Provisional application No. 62/489,394, filed on Apr. 24, 2017.

(51) Int. Cl.
*H01M 50/24* (2021.01)
*H01M 10/653* (2014.01)
*H01M 50/20* (2021.01)

(52) U.S. Cl.
CPC ......... *H01M 50/24* (2021.01); *H01M 10/653* (2015.04); *H01M 50/20* (2021.01); *H01M 2220/20* (2013.01)

(58) Field of Classification Search
None
See application file for complete search history.

(56) References Cited

U.S. PATENT DOCUMENTS

| 3,936,414 A | 2/1976 | Wright et al. |
| 4,923,908 A | 5/1990 | Lostumo |
| 5,686,541 A | 11/1997 | Wang et al. |
| 6,127,724 A | 10/2000 | DiStefano |
| 8,133,609 B2 | 3/2012 | Kim et al. |
| 8,286,743 B2 | 10/2012 | Rawlinson |

(Continued)

FOREIGN PATENT DOCUMENTS

WO 2016016170 A1 2/2016

OTHER PUBLICATIONS

ISA United States Patent and Trademark Office, International Search Report and Written Opinion Issued in Application No. PCT/US2018/028916, dated Jul. 12, 2018, WIPO, 10 pages.

(Continued)

*Primary Examiner* — Wyatt P McConnell
(74) *Attorney, Agent, or Firm* — McCoy Russell LLP

(57) ABSTRACT

Methods and systems are provided for a battery encapsulant. In one example, a method may include a battery encapsulant surrounding one or more battery cells of a vehicle battery, where the encapsulant comprises a Young Modulus between 0.05 to 0.15 GPa after being cured.

19 Claims, 6 Drawing Sheets

(56) References Cited

U.S. PATENT DOCUMENTS

| | | | |
|---|---|---|---|
| 2008/0090137 A1* | 4/2008 | Buck | H01M 50/20 |
| | | | 429/120 |
| 2008/0116550 A1 | 5/2008 | Edwards | |
| 2010/0136413 A1 | 6/2010 | Hermann et al. | |
| 2012/0219838 A1 | 8/2012 | Terada et al. | |
| 2013/0101874 A1 | 4/2013 | Pevear | |
| 2018/0212208 A1* | 7/2018 | Kim | C08L 81/04 |

OTHER PUBLICATIONS

European Patent Office, Extended European Search Report Issued in Application No. 18791418.9, dated Dec. 3, 2020, Germany, 8 pages.

* cited by examiner

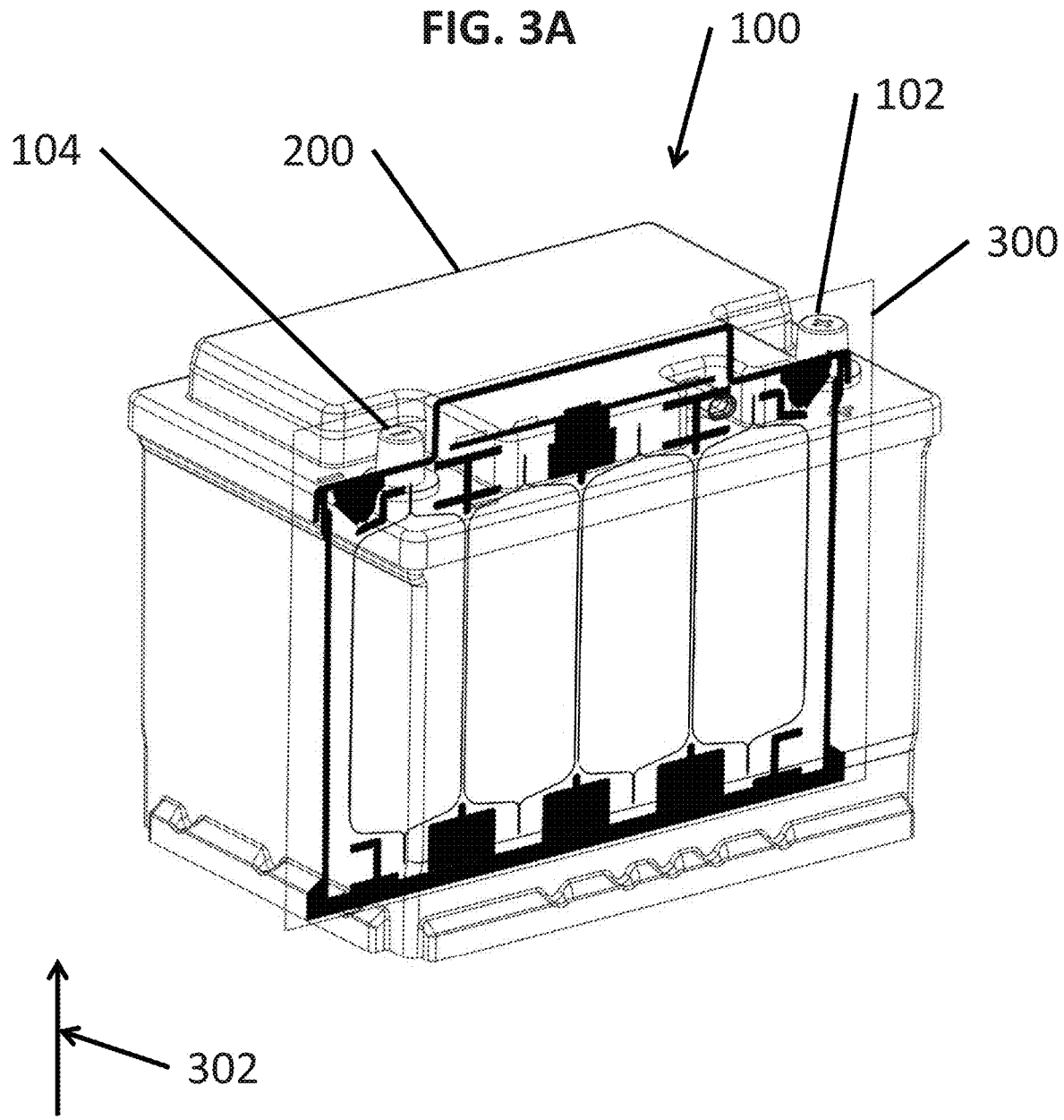

STRUCTURAL POTTING MATERIAL USED TO INCREASE CRUSH RESISTANCE

CROSS REFERENCE TO RELATED APPLICATION

The present application is a U.S. National Phase of International Patent Application No. PCT/US2018/028916, entitled "STRUCTURAL POTTING MATERIAL USED TO INCREASE CRUSH RESISTANCE", and filed on Apr. 23, 2018. International Patent Application No. PCT/US2018/028916 claims priority to U.S. Provisional Application No. 62/489,394, entitled "Structural Potting Material Used to Increase Crush Resistance", and filed on Apr. 24, 2017. The entire contents of each of the above-listed applications are hereby incorporated by reference for all purposes.

FIELD

The present application relates to multi-cell battery systems that comprise an encapsulant around a plurality of battery cells.

BACKGROUND AND SUMMARY

Many vehicle batteries utilize battery cells assembled in series and parallel to meet the current and/or voltage requirements of the vehicle. However, the inventors herein have recognized potential issues with such vehicle batteries.

The forces generated during a vehicle impact or crash may be sufficiently large to damage and/or reduce the functionality of the vehicle battery. More specifically, with the increased use of Lithium Ion batteries, the inventors herein have recognized a need to increase the amount of compressive force such batteries can withstand.

This design also has created new ways of assembling and fixing cells and groups of cells within the battery, by using the very same elements that provide the crush protection to also constrain and retain the cells.

In one example, the issues described above may be addressed by a method for a battery comprising a plurality of battery cells, arranged and stacked to form a series of battery cell groups and an encapsulant having a Young Modulus in a range of 0.05 to 0.15 GPa surrounding the battery cell groups. In this way, the encapsulant may provide thermal transfer effects while also providing crush resistance.

As one example, the encapsulant is located in different regions of the battery. Additionally, these regions surround battery cells such that the encapsulant is located between the battery cells and an ambient atmosphere. As such, the encapsulant functions as a medium transferring heat from the battery cells to ambient air. Additionally, in the event of a collision, the encapsulant provides crush resistance to the battery cells. This prevents rupturing of membranes within the battery cells. In this way, degradation of the battery cells is mitigated and/or prevented in the event of a collision.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3A shows a vertical cross-sectional plane of the battery.
FIGS. 1-4B are shown approximately to scale.

DETAILED DESCRIPTION

The present disclosure will now be described in further detail herein with reference to the accompanying figures, in which exemplary embodiments of the present disclosure are illustrated. The particular embodiment is merely exemplary in nature and is in no way intended to limit the scope of the invention, its application, or uses, which may vary. The embodiments disclosed herein are described with relation to the non-limiting definitions and terminology included herein. These definitions and terminology are not intended to function as a limitation on the scope or practice of the invention, but are presented solely for illustrative and descriptive purposes. While the processes and/or compositions may be described as an order of individual steps or using specific materials, it will be appreciated that steps or materials may be interchangeable such that the description of the disclosure herein may include multiple parts or steps arranged in many different ways.

Components, process steps, and other elements that may be substantially the same in one or more embodiments are identified coordinately and are described with minimal repetition. It will be noted however, that elements identified coordinately may also differ to some degree.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" refers to "and/or". As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or other components, but do not preclude the presence or addition of one or more other features, regions, integers, steps, operations, elements, components, and/or groups thereof. The term "a combination thereof" or "a mixture of" means a combination including at least one of the foregoing elements.

Unless otherwise defined, all terms (including technical and scientific terms) used herein have the same meaning as commonly understood by one of at least ordinary skill in the art to which the disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly defined herein.

Figure 1:
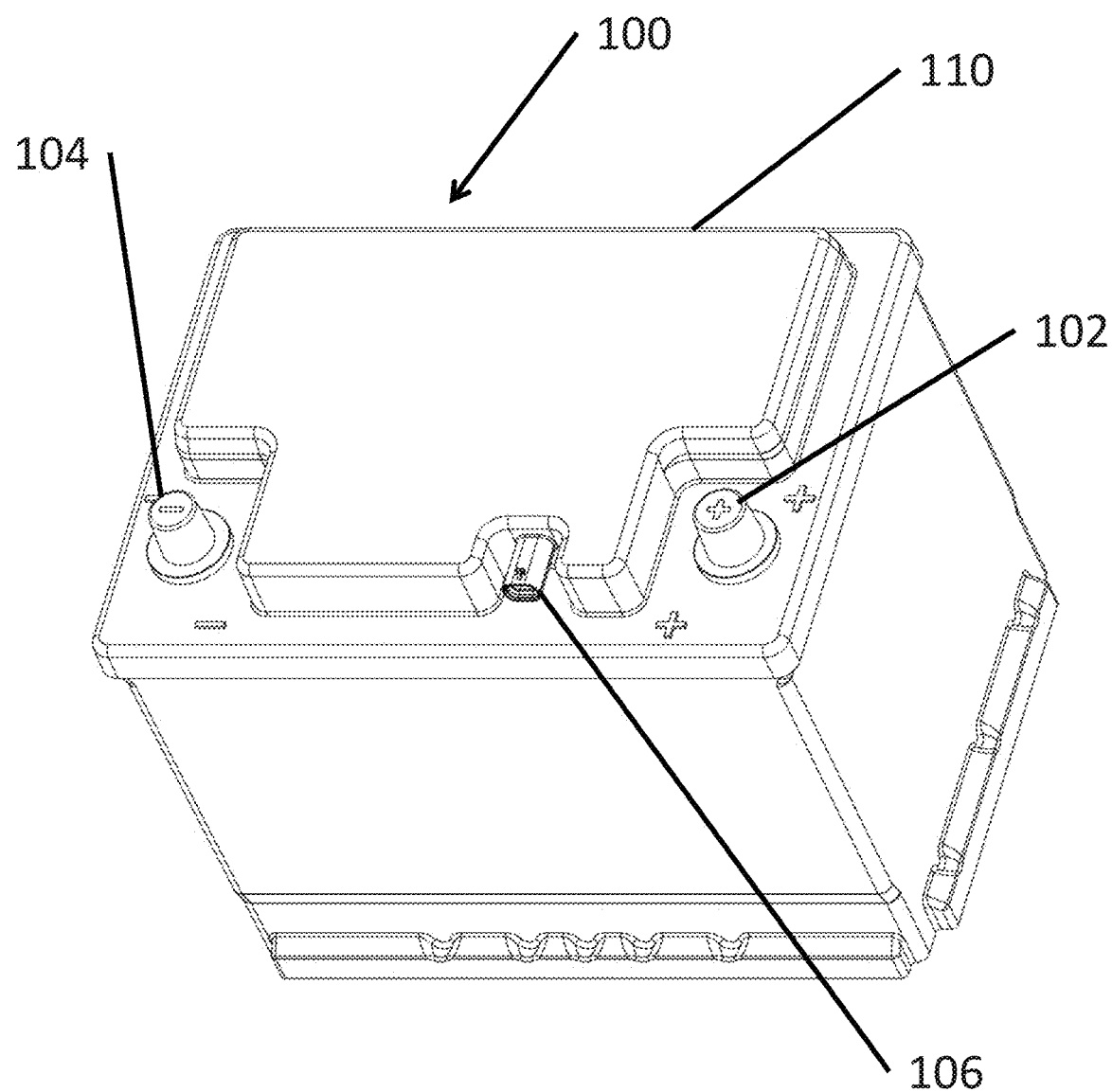
FIG. 1 shows a battery.

FIG. 1 shows an automotive battery 100 with an outer case 110, a negative terminal 102 and a positive terminal 104, and a LIN (Local Interconnect Network) management interface 106 which is a connector for coupling to a LIN within the vehicle. Case 110 is molded, and electrical terminals 102 and 104 are insert-molded in place on the case. The case consists of a top cover that includes the terminals, and an enclosure base. The outer case 110 in at least one embodiment may comprise an aluminum construction, however, other material constructions have been realized herein.

Figure 2:
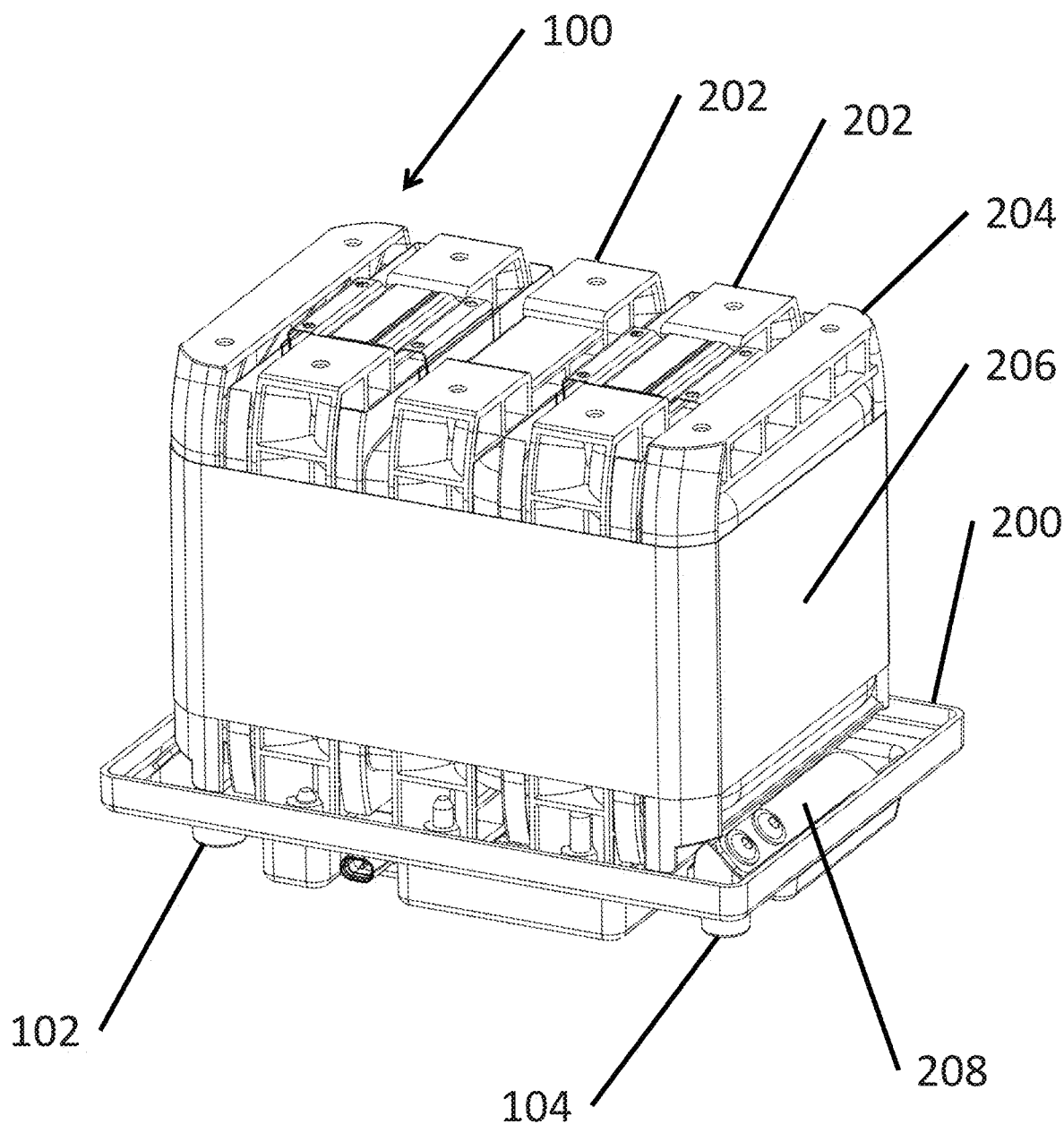
FIG. 2 shows an interior of the battery.

FIG. 2 shows the inside of automotive battery 100 with the enclosure case removed. The battery is shown from a perspective rotated 180 degrees upside-down in relation to FIG. 1. The battery contains one or more cell subunits 202. The cell subassemblies are a basic building block from which automotive batteries of arbitrary scales may be constructed. The cell subassemblies contain Lithium-Ion prismatic battery cells (not visible), each of which provides a portion of the battery's electrical power and storage capacity. The cell subassemblies 202 are held together by pressure plate 204, top cover 200, and bands 206. The individual battery cells are electrically connected in parallel and/or series by busbars (described in the related application) which connect the cells to one another and to the terminals of the battery. One such busbar 208 is shown in FIG. 2 connecting one respective terminal of each of four different battery cells together. Busbar 208 also connects the four terminals to positive terminal 104.

The prismatic automotive battery described herein has a group of identical cells. The quantity of cells per module and the module's electrical connection configuration (parallel count versus series count) defines the module's electrical characteristics and performance ratings. For example, battery 100 is configured in a '4S4P' configuration which has 16 cells in four subgroups, where the subgroups are electrically connected in series, and with four cells in each subgroup that are electrically connected in parallel. Depending on the configuration, automotive batteries may contain either an even or an odd number of battery cells.

Thus, the description above described a vehicle starter batter. The figures below further described the battery, where the battery comprises a plurality of battery cells, arranged and stacked to form a series of battery cell groups and an encapsulant having a Young Modulus in a range of 0.05 to 0.15 GPa surrounding the battery cell groups. In some examples, the encapsulant is an epoxide. The encapsulant further has a Flex Modulus in a range of 0.100 to 0.250 GPa. In one example, the Flex Modulus is equal to exactly 0.180 GPa. Additionally or alternatively, the encapsulant is a liquid filling at least a portion of air gaps in a housing. In other examples, additionally or alternatively, the encapsulant is a solid molded around the battery cell groups and where the housing surrounds the encapsulant. The encapsulant is cured after being injected into interior spaces of the battery. Additionally or alternatively, the encapsulant is cured and molded to the battery cells before being placed in a battery housing.

FIG. 3A shows the inside of the automotive battery 100 with the enclosure case removed, similar to that shown in FIG. 2. However, the battery 100 is shown from a perspective rotated 180° upside-down in relation to FIG. 2. A cross-section 300 is shown intersecting the battery 100 along a plane parallel to a vertical axis 302.

Figure 3B:
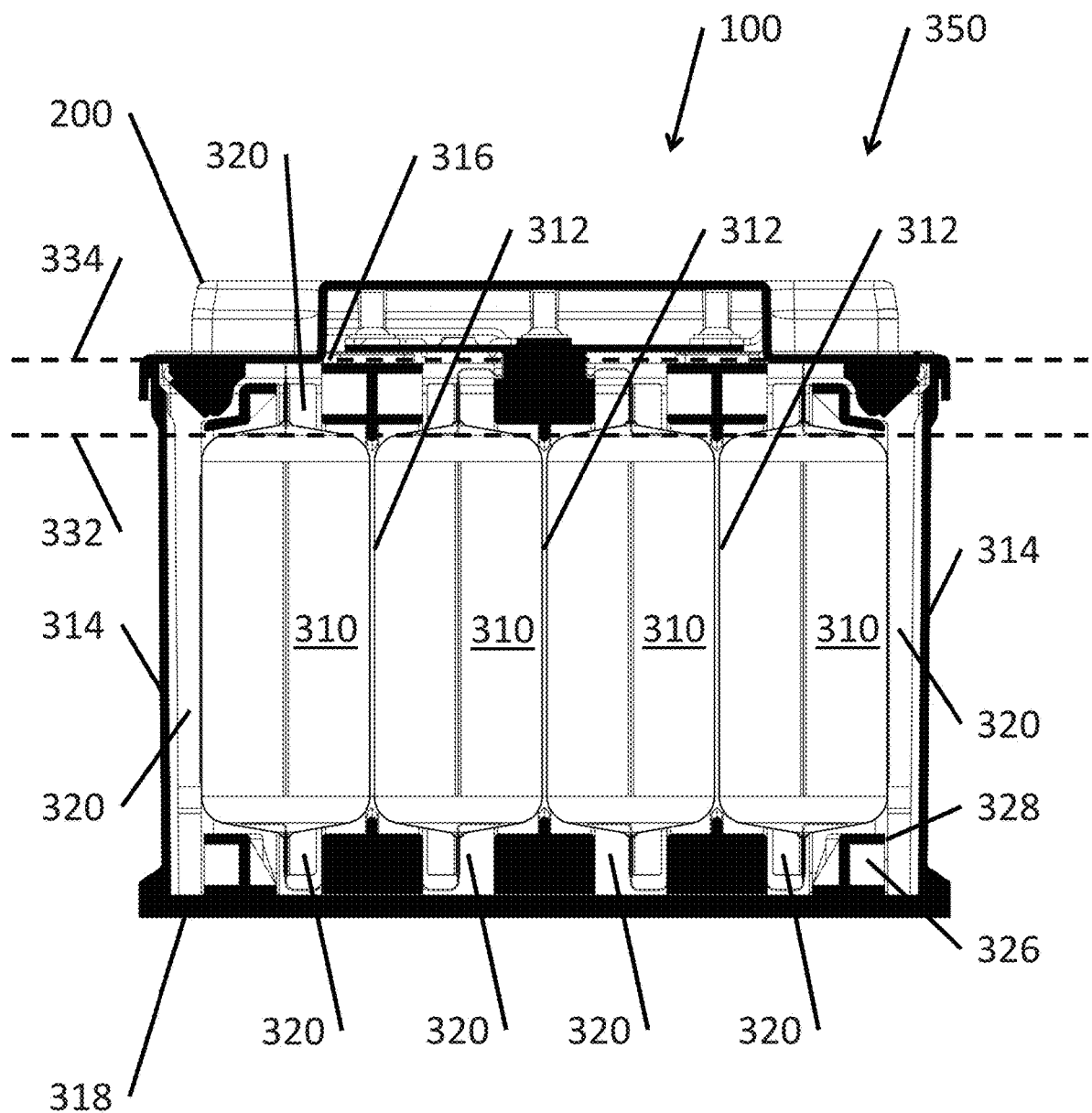
FIG. 3B depicts the cross-section of the battery according to FIG. 3A.

FIG. 3B shows an interior 350 of the automotive battery 100 according to the cross-section 300 of FIG. 3A. Battery cells 310 are separated by partitions 312 along a horizontal axis. The partitions 312 may be rigid in at least one embodiment. An area within the battery 100 for housing the battery cells 310 is limited by side walls 314, top wall 316, and bottom wall 318. The top wall 316 is adjacent the top cover 200 and the bottom wall 318 is distal to the top cover 200. In at least one embodiment the top wall 316 is undulating in shape and comprises cutouts adjacent the top cover 200 for electrically coupling the battery cells 310 to an electric circuit.

Encapsulant 320 surrounds the battery cells 310. Specifically, the encapsulant 320 is located between the battery cells 310 and the top wall 316, the battery cells 310 and the bottom wall 318, and the battery cells 310 and the side walls 314. In one embodiment, the encapsulant 320 is a potting material. In each instance, the portions of encapsulant 320 are physically separated from one another.

Boundary 326 is located between the side walls 314 and the battery cells 310. The boundary 326 comprises protrusions 328 extending from the boundary 326 to a side wall of the side walls 314.

Surfaces of the battery cells 310, partitions 312, top wall 316, side walls 314, and bottom wall 318 may be treated with fiberglass or other materials comprising one or more of some content of fiber and some content of glass to increase adhesion between the encapsulant and the surfaces. For example, surfaces of the battery cells 310 are rough, with small (e.g., between 0.1 to 2 micrometers) protrusions extending into empty spaces of the battery 100. The encapsulant 320 may bind to and surround these protrusions as the encapsulant 320 is cured. Additionally or alternatively, smooth surfaces within the battery 100 may be made less uniform and/or smooth via etchings, abrasion devices (e.g., sander), and/or other methods to introduce inconsistencies on surfaces within the battery, thereby forming pockets for the encapsulant to fill and bind with.

The encapsulant 320 comprises a Young Modulus in the range of 0.05 to 0.15 GPa after curing. Specifically, the encapsulant 320 comprises a Young Modulus equal to exactly 0.06 GPa (60 MPa). Alternatively or additionally, the encapsulant 320 comprises a Young Modulus greater than or equal to at least 0.06 GPa. This allows the encapsulant 320 to be relatively pliable and/or flexible. Additionally, the encapsulant 320 comprises a Flex Modulus in the range of 0.100 to 0.250 GPa after curing. In one example, the encapsulant 320 comprises a Flex Modulus equal to exactly 0.180 GPa (180 MPa). Alternatively or additionally, the encapsulant comprises a Flex Modulus greater than or equal to at least 0.180 GPa. The cured encapsulant 320 synergistically provides a desired compressive strength in a plurality of directions. Said another way, the encapsulant 320 may receive a large amount of force from an external object, as a result of an accident, while imparting a small portion or zero of the force to the battery cells 310, thereby preventing crushing and/or degradation of the battery cells 310.

A combination of Young Modulus and Flex Modulus ranges may be calibrated based on a battery cell structure and arrangement (e.g., cylindrical vs prismatic). As such, the Young Modulus and Flex Modulus may be adjusted to provide the desired benefits. For example, the encapsulant 320 may comprise a Young Modulus of 0.08 GPa and a Flex Modulus of 0.200 GPa. It will be appreciated that a plurality of Young and Flex Modulus ranges may be achieved without departing from the scope of the present disclosure.

The encapsulant 320 may be composed of epoxy in the form of either a mono-polymer or a co-polymer, in one example. In this way, the encapsulant 320 is relatively flexible while providing thermal transfer capabilities similar to other encapsulants known in the art. In this way, encapsulant 320 provides crash protection while simultaneously providing heat transferring abilities to cool the batteries. Said another way, the encapsulant is thermally conductive and crush resistant.

The encapsulant 320 may be a liquid or solid. If the encapsulant 320 is a liquid, the encapsulant 320 is inserted and/or injected into certain areas in a battery enclosure (e.g., interior to the top, bottom and side walls) where the encapsulant may cure and solidify. Alternatively, if the encapsulant is a solid, the encapsulant 320 is molded around the battery cells 310. As such, the top, bottom, and side walls may be placed around the encapsulant 320. Air bubbles are removed and/or prevented from forming in the battery 100.

If the encapsulant 320 is a liquid, the encapsulant 320 is arranged into the battery 100 prior to the battery cells 310. The encapsulant 320 is displaced once the battery cells 310 are loaded into the battery 100. The encapsulant 320 is cured via one or more of heating, light, moisture, and a chemically reactive additive. Dashed lines 332 and 334 indicate a maximum fill line range following curing of the encapsulant 320. In one example, the amount of encapsulant arranged in the battery 100 prior to submersion of the battery cells 310 is selected based on the maximum fill line range. In another example, the curing may be adjusted based on a position of the cured encapsulant relative to the maximum fill line range. In this way, the encapsulant is prevented from contacting electric circuits of the battery 100 located above the dashed line 334 while providing increased crush protection to the battery cells 310.

In another example, a threshold amount of encapsulant 320 is loaded into a battery enclosure. Battery cells 310 are positioned (e.g, pressed) into the battery enclosure, where the encapsulant is displaced. This may limit formation of air bubbles. The encapsulant 320 may be cured following addition of the battery cells 310. In one example, electrical connections between the battery cells 310 and a circuit are made prior to curing the encapsulant 310. In another example, the electrical connections are formed following curing the encapsulant 310. By loading the encapsulant into the battery enclosure prior to the battery cells, a curing temperature of the encapsulant may be relatively low (e.g., 30-70° C.), thereby protecting the battery cells 310 from degradation. The degradation may include leaking battery membranes.

Figure 4A:
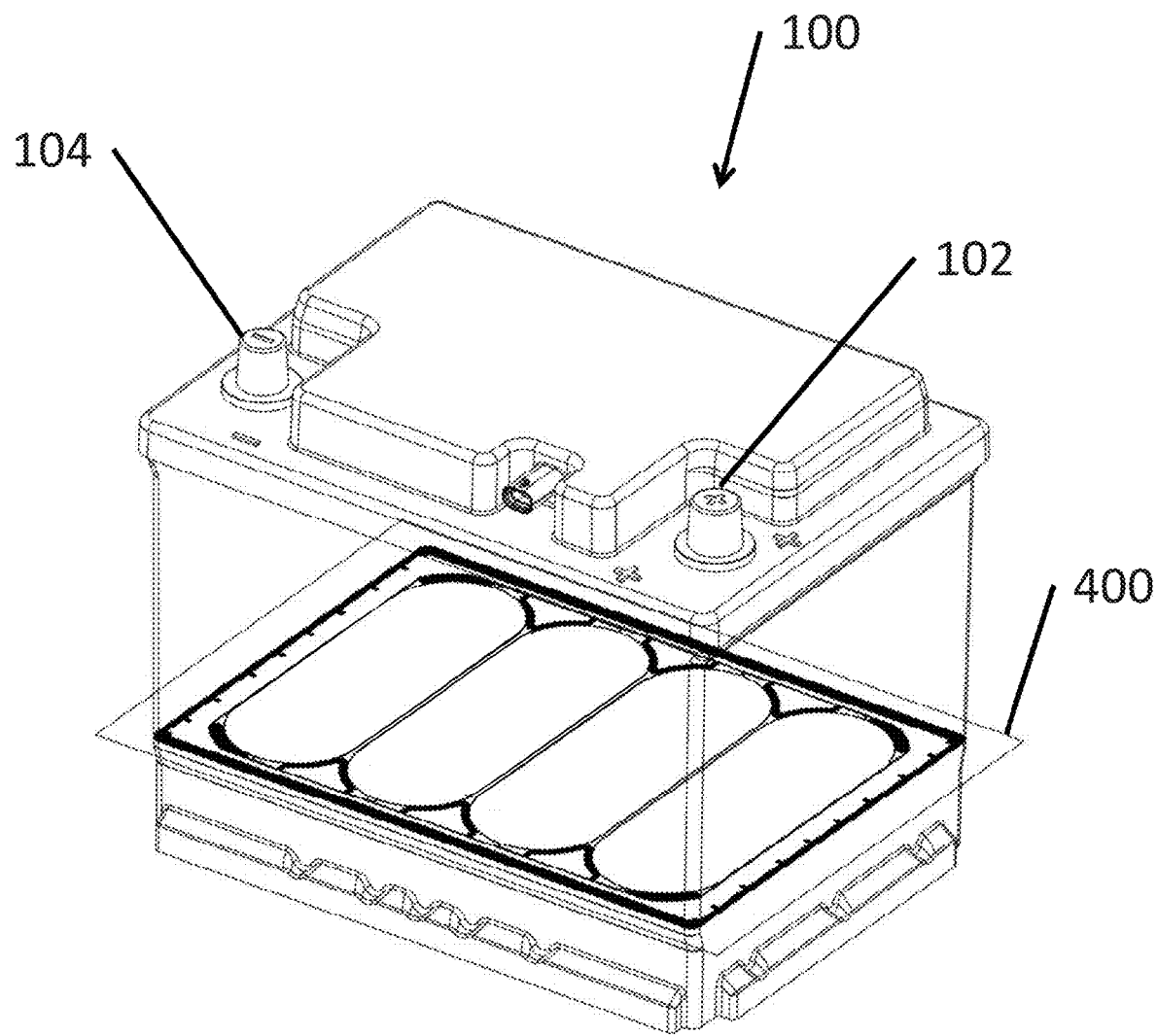
FIG. 4A shows a horizontal cross-section plane of the battery.

FIG. 4A shows the inside of the automotive battery 100 with the enclosure case removed, similar to that shown in FIG. 3A. However, a cross-section 400 is shown intersecting the battery 100 along a plane parallel to a horizontal axis 304, which is perpendicular to cross-section 300.

Figure 4B:
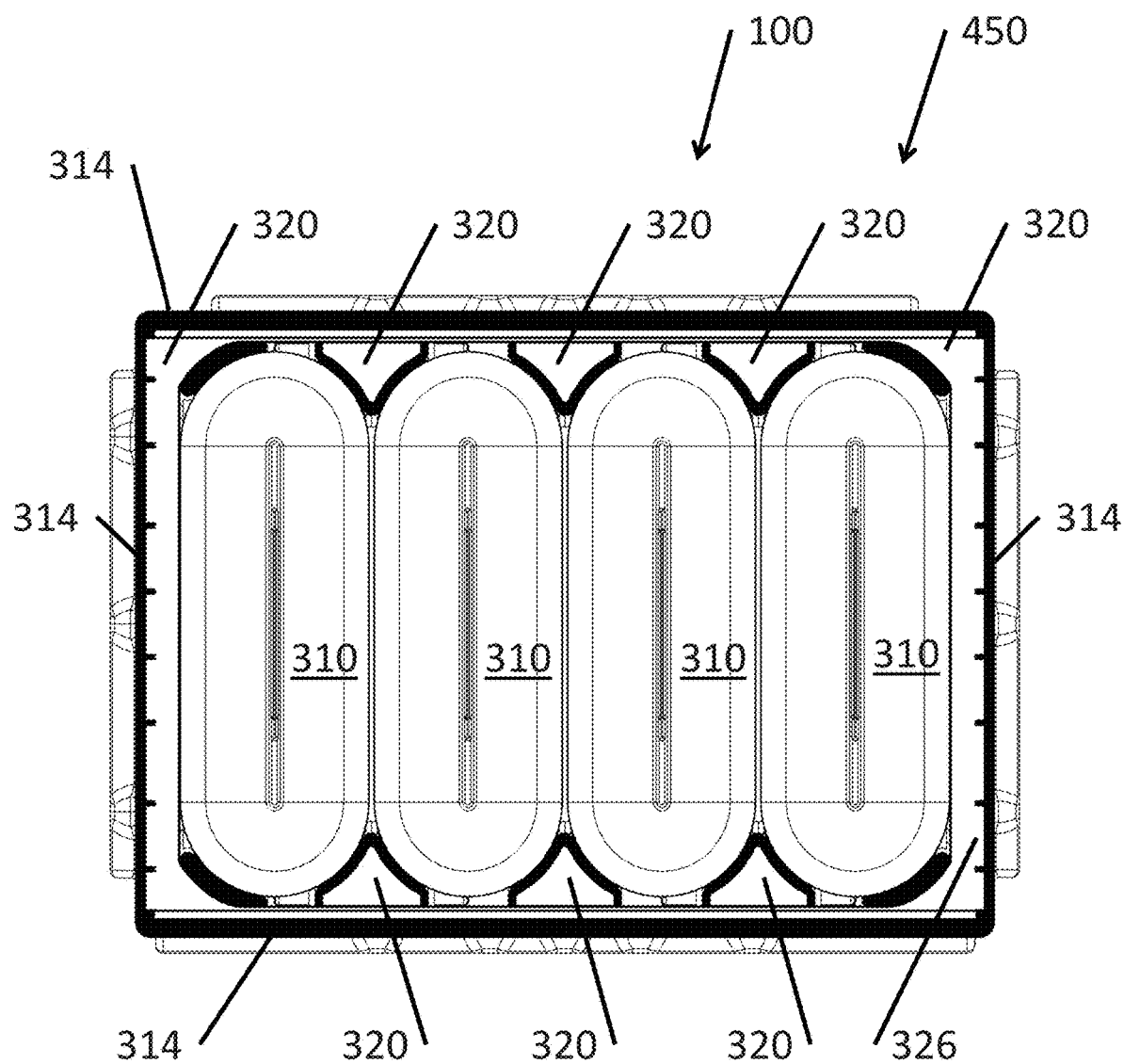
FIG. 4B shows the cross-section of the battery according to FIG. 4A.

FIG. 4B includes a depiction of the cross-section 450 of the battery 100. A portion of encapsulant 320 is shown as a continuous encapsulant completely surrounding the battery cells 310 between the battery cells 310 and the side walls 314. In this way, for an entire height and length of the battery 100, encapsulant 320 is in face-sharing contact with the side walls 314, a portion of a top wall (e.g., top wall 316 of FIG. 3B), and a portion of a bottom wall (e.g., bottom wall 318 of FIG. 3B). By doing this, movement of internal components of the battery 100 (e.g., battery cells 310) is reduced and/or prevented by the encapsulant in response to a vehicle crash. This may decrease a likelihood of an electrical short.

In this way, the encapsulant may be used with a variety of battery form factors. Air gaps in a battery are filled with the encapsulant to protect the encapsulant from crushing during a vehicle impact while also providing thermal and vibration dampening. By doing this, the encapsulant may be selectively placed into batteries demanding crush protection while being omitted from constructed batteries that do not demand crush protection.

The technical effect of using an encapsulant having calibrated Young and Flex Modulus values is to provide a variety of battery form factors with an optimized crush resistance while also provide a desired thermal transfer capability.

An example of a battery comprising a plurality of battery cells, arranged and stacked to form a series of battery cell groups and an encapsulant having a Young Modulus in a range of 0.05 to 0.15 GPa surrounding the battery cell groups. A first example of the battery further includes where the encapsulant is an epoxide. A second example of the battery, optionally including the first example, further includes where the encapsulant has a Flex Modulus in a range of 0.100 to 0.250 GPa. A third example of the battery, optionally including the first and/or second examples, further includes where the Flex Modulus is equal to exactly 0.180 GPa. A fourth example of the battery, optionally including one or more of the first through third examples, further includes where the encapsulant is a liquid filling at least a portion of air gaps in a housing. A fifth example of the battery, optionally including one or more of the first through fourth examples, further includes where the encapsulant is a solid molded around the battery cell groups and where the housing surrounds the encapsulant. A sixth example of the battery, optionally including one or more of the first through fifth examples, further includes where the Young Modulus is equal to exactly 0.06 GPa. A seventh example of the battery, optionally including one or more of the first through sixth examples, further includes where the encapsulant is cured after being injected into interior spaces of the battery. An eighth example of the battery, optionally including one or more of the first through seventh examples, further includes where the encapsulant is cured and molded to the battery cells before being placed in a battery housing. A ninth example of the battery, optionally including one or more of the first through eighth examples, further includes where the battery cells are prismatic. A tenth example of the battery, optionally including one or more of the first through ninth examples, further includes where the battery cells comprise carbon fiber surfaces having small protrusions extending into spaces of the battery, forming pockets for the encapsulant to fill. An eleventh example of the battery, optionally including one or more of the first through tenth examples, further includes where the battery is a vehicle starter battery.

An example of a vehicle starter battery comprising a plurality of battery cells located interior to top, bottom, and side walls, and where an encapsulant is located between the battery cells and each of the top, bottom, and side walls, and where the encapsulant comprises a Flex Modulus between 0.100 and 0.250 GPa. A first example of the vehicle starter battery further includes where encapsulant between the battery cells and the top wall is fluidly separated from encapsulant between the battery cells and the bottom and side walls. A second example of the vehicle starter battery, optionally including the first example, further includes where the encapsulant is flexible and comprises a Young Modulus between 0.05 and 0.10 GPa. A third example of the vehicle starter battery, optionally including the first and/or second examples, further includes where the encapsulant comprises a Flex Modulus of exactly 0.180 GPa and a Young Modulus of exactly 0.06 GPa. A fourth example of the vehicle starter battery, optionally including the first through third examples, further includes where the encapsulant is thermally conductive and crush resistant.

An example of a vehicle battery comprising an encapsulant surrounding a plurality of battery cells arranged within the confines of top, side, and bottom walls of a battery housing, and where the encapsulant is located between the battery cells and each of the top, side, and bottom walls, and where the encapsulant comprises a Young Modulus between 0.05 to 0.10 GPa and a Flex Modulus between 0.100 to 0.250 GPa. A first example of the vehicle battery further includes where the encapsulant is cured inside the battery housing. A second example of the vehicle battery, optionally including the first example, further includes where the encapsulant is cured outside the battery housing.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof.

The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A battery, comprising:
    a plurality of battery cells, arranged and stacked to form a series of battery cell groups; and
    an encapsulant having a Young Modulus in a range of 0.05 to 0.15 GPa and a Flex Modulus in a range of 0.100 to 0.250 GPa, the encapsulant surrounding the series of battery cell groups.

2. The battery of claim 1, wherein the encapsulant is an epoxide.

3. The battery of claim 1, wherein the Flex Modulus is equal to exactly 0.180 GPa.

4. The battery of claim 1, wherein the encapsulant is a liquid filling at least a portion of air gaps in a housing.

5. The battery of claim 1, wherein the encapsulant is a solid molded around the series of battery cell groups and where a housing surrounds the encapsulant.

6. The battery of claim 1, wherein the Young Modulus is equal to exactly 0.06 GPa.

7. The battery of claim 1, wherein the encapsulant is cured after being injected into interior spaces of the battery.

8. The battery of claim 1, wherein the encapsulant is cured and molded to the plurality of battery cells before being placed in a battery housing.

9. The battery of claim 1, wherein the plurality of battery cells is prismatic.

10. The battery of claim 1, wherein the plurality of battery cells comprises carbon fiber surfaces having small protrusions extending into spaces of the battery, forming pockets for the encapsulant to fill.

11. The battery of claim 1, wherein the battery is a vehicle starter battery.

12. A vehicle starter battery, comprising:
    a plurality of battery cells located interior to top, bottom, and side walls, and where an encapsulant is located between the plurality of battery cells and each of the top, bottom, and side walls, and where the encapsulant comprises a Young Modulus between 0.05 to 0.15 GPa and a Flex Modulus between 0.100 and 0.250 GPa.

13. The vehicle starter battery of claim 12, wherein encapsulant between the plurality of battery cells and the top wall is fluidly separated from encapsulant between the plurality of battery cells and the bottom and side walls.

14. The vehicle starter battery of claim 12, wherein the encapsulant is flexible and comprises a Young Modulus between 0.05 and 0.10 GPa.

15. The vehicle starter battery of claim 14, wherein the encapsulant comprises a Flex Modulus of exactly 0.180 GPa and a Young Modulus of exactly 0.06 GPa.

16. The vehicle starter battery of claim 12, wherein the encapsulant is thermally conductive and crush resistant.

17. A vehicle battery, comprising:
   an encapsulant surrounding a plurality of battery cells arranged within the confines of top, side, and bottom walls of a battery housing, and where the encapsulant is located between the battery cells and each of the top, side, and bottom walls, and where the encapsulant comprises a Young Modulus between 0.05 to 0.10 GPa and a Flex Modulus between 0.100 to 0.250 GPa.

18. The vehicle battery of claim 17, wherein the encapsulant is cured inside the battery housing.

19. The vehicle battery of claim 17, wherein the encapsulant is cured outside the battery housing.

* * * * *